Nov. 18, 1969  A. L. SMOOKLER ET AL  3,479,061
PARTIALLY BALANCED FLEXIBLE PIPE JOINT
Filed Sept. 23, 1966  2 Sheets-Sheet 1

INVENTORS
F. E. GRUBER
A. L. SMOOKLER
BY
ATTY.

3,479,061
PARTIALLY BALANCED FLEXIBLE PIPE JOINT

Arthur L. Smookler, Rte. 4, Box 367, Annapolis, Md. 21401, and Floyd E. Gruber, 5004 Lindsay Road, Baltimore, Md. 21219
Continuation-in-part of application Ser. No. 364,039, Apr. 30, 1964. This application Sept. 23, 1966, Ser. No. 592,696
Int. Cl. F16l 19/02, 21/00
U.S. Cl. 285—94            10 Claims

ABSTRACT OF THE DISCLOSURE

A flexible pipe joint of the ball and socket type in which flexibility is provided by the use of two concentric ball and socket pairs and fluid passages are provided between the interior of the pipes and the joint between the outer ball and socket pair, the axial area acted on by the fluid in these passages being selected to provide a partial pressure balance across the joint.

---

This application is a continuation-in-part of application Ser. No. 364,039 filed April 30, 1964, and now abandoned, for "Flexible Pipe Joint."

The invention described herein may be manufactured and used by or for the Government of the United States of America for governmental purposes without the payment of any royalties thereon or therefor.

The present invention relates to flexible pipe connections to carry a pressurized fluid, and more particularly to a ball and socket type of flexible pipe joint, involving the provision of means for only limited or partial pressure balancing of the joint.

When a piping system is connected to a piece of machinery, the pipes in the system will vibrate as the machinery vibrates. If the machinery is mounted on flexible supports, as it often is aboard seagoing vessels, there is additional pipe movement caused by movement of the machinery. A certain degree of flexibility is required in the piping system to reduce pipe line stresses and reduce pipe vibrations generated by the machinery. Where space and weight requirements of the piping system environment are not critical, flexibility may be achieved by using long, multidirectional runs of pipe. Where space and weight are primary considerations, however, as on submarines, resort must be had to other means to achieve flexibility.

Several types of pipe joints have been suggested for obtaining the needed flexibility, but none have proved entirely satisfactory. Braided steel hose connections between pipes render the connection somewhat flexible, but the flexibility is inversely proportional to the thickness of the hose. Thus, where the pressure of the fluid within the pipe is high, the hose must be thick, and the needed flexibility may not be obtained. Furthermore, since sea water causes corrosion of steel hoses, the use of such hoses in piping systems on ships where sea water is used in the system is impractical.

Bellows connections will also increase pipeline flexibility, but, as in steel hose connections, the flexibility is achieved by decreasing the bellows wall, which increases likelihood of the system failure caused by the fluid pressure therein. Furthermore, the stress levels within the convolutes of the bellows are theoretically unpredictable, and the convolutes are highly susceptible to fatigue failure, since the flexibility occurs within the metal itself. Thus, such connections are neither safe nor reliable.

Packed joints rely on the compression of packing material for effective sealing. Where flexibility is required in these joints, the packing material must be packed loose enough to permit flexibility, but tight enough to effectively seal the joint. Consequently the flexibility in piping systems employing packed joints is limited by the sealing requirements of the joint. Another disadvantage of packed joints is that the packing material often erodes or frets away, permitting leakage.

Ball-and-socket joints inherently eliminate the aforemention dangers of fatigue failure, since flexibility therein is achieved by relative movement of a ball in a socket, rather than in the stretching or bending of a piece of structural material. However, in relatively high pressure systems it becomes very difficult, if not impossible, to move the ball in the socket because the fluid pressure in the pipes urges the ball-carrying pipe-end away from the socket-carrying pipe-end, creating enormous frictional forces between the contacting surfaces of the ball and socket. This problem has been alleviated to some extent by placing bearing materials between the ball and the socket to reduce the coefficient of friction therebetween, and seals between the ball and bearing materials to prevent leakage therebetween of the fluid in the system. However, when the ball is rotated relative to the bearing materials under high pressure conditions, it causes galling of the bearing surfaces and extrusion of the seals, eventually resulting in failure of the system.

Pressure balanced ball and socket pipe joints or connections of the prior art provide two equals areas enclosed between seals which are exposed to the pressure in the pipe system. These areas cause two equal and opposite thrusts which allow the ball to "float" in its fixture or socket. Failures in this type of pipe joint have been by extrusion of the seals into the resulting clearance space under the pressure, followed by pinching and destruction of the extruded seals caused by high relative excursions or vibration of the ball in its socket, and by erosion of seals due to foreign particles entrained in the fluid contained within the pipe and corrosion of bearing and sealing surfaces caused again by the fluid carried within the pipe.

With such pressure balanced ball and socket pipe joints it has been necessary to fit the parts of the joint during manufacture within very exacting tolerances with a minimum of clearance between the sealing surfaces to provide for sealing ring life. This was a very expensive task. In addition service will cause wear of the sealing surfaces and subsequent increased clearances and sealing ring wear.

The invention involves, in a flexible pipe joint of the ball and socket type for carrying a pressurized fluid, the provision of means providing limited or partial pressure balancing or counteracting of the pressure tending to force apart the pipe sections of the ball and socket pipe joint or coupling, so that a resultant position thrust or imbalance maintains the ball in intimate contact with its bearing and seals, minimizing the space therebetween and preventing extrusion, pinching, and destruction of seals by vibratory motion. It also makes unnecessary the precision machining previously required in pressure balanced ball and socket joints.

The invention also involves, amongst other features, and as will be more particularly described hereinfater, the provision of such limited or partial pressure balancing or counteracting means in a ball and socket joint having an inner ball with primary seal and an outer ball with spaced pressure balancing or counteracting seals disposed relative to said primary seal in such manner as to provide the limited or partial pressure balancing or counteracting.

For a given pipe size, the device of the invention which provides the primary seal at the inner ball and the spaced pressure counteracting seals at the outer ball, has a relatively smaller primary seal area and thus thrust to partially balance or counteract, then do the pressure balanced ball and socket pipe joints or connections of the prior art. This is because the inner ball only has to be large enough to take the primary seal and its motion and not three seals and their motion as in the single ball and seals arrangements of the prior art (motion being the amount of pivotal travel allowed). In pressure balanced single ball and seals devices of the prior art, the three seals comprise a seal ring engaging the ball at the transverse medial plane thereof and seal rings engaging the ball at either side of the medial seal.

In view of the foregoing, it is an object of the present invention to eliminate the difficulties and deficiencies associated with the prior art pipe conections, and to provide in there stead an improved connection which permits pipeline flexibility, and yet is safe and reliable in operation.

It is another object of this invention to provide a flexible pipe joint having partial pressure balance between the mating parts.

It is a further object of this invention to provide a flexible pipe joint having partial pressure balance and is made flexible through concentric ball and socket joints.

It is yet another object of the invention to provide a flexible pipe joint having partial pressure balance in which the fluid pressure in the pipes is partially balanced by pressure of a second fluid.

It is yet another object of this invention to provide a flexible pipe joint having partial pressure balance across the joint in which the balancing pressure is obtained by amplification of the pipe fluid pressure.

Other objects and many of the attendant advantages of this invention will be readily appreciated as the same becomes better understood by reference to the following detailed description when considered in connection with the accompanying drawings wherein.

Figure 1:
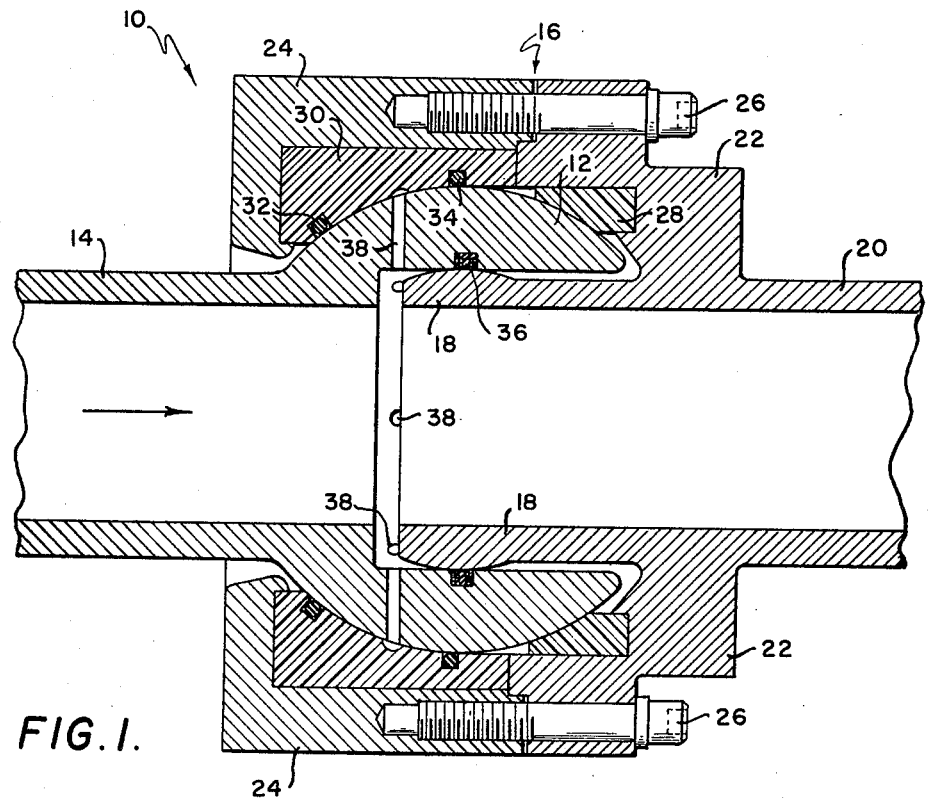
FIG. 1 is a plan view, in section, of a preferred embodiment of the invention.

Referring now to the drawings, wherein like reference characters designate like or corresponding parts throughout the several views thereof, there is shown on FIG. 1 a flexible pipe joint 10 of the ball-and-socket type. The joint includes a pipe section 14 which carries an outer ball member 12 on one end, and a pipe section 20 which carries a socket member 16 and an inner ball member 18 on one end. The socket member 16 receives the outer ball member 12 for movement therein. The outer ball member is hollow and forms a socket for the inner ball member 18 and is concentric therewith. The other ends of pipe sections 14 and 20 (not shown) are to be welded or otherwise secured to the pipes in a pipeline which the joint 10 connects.

The socket member 16 includes an extension 22 on pipe section 20, and a retainer housing 24 secured thereto by cap screws 26 to facilitate assembly and diassembly of the joint. Seated in socket member 16 are replaceable bearing rings 28 and 30 for facilitating flexing rotational movement of the outer ball member 12. Grooves in bearing ring 30 and in the inner surface of the outer ball member 12 retain sealing rings 32, 34 and 36 for preventing leakage of fluid from within the pipe sections 14 and 20.

As will be apparent from FIG. 1, the pressure of the fluid in the pipe sections 14 and 20 will tend to force the pipe sections away from one another. This force will press the outer ball against the bearing ring 30, making it very difficult to rotate the outer ball relative to the socket member 16 and the bearing ring 30. If the outer ball may be rotated, it will tend to gall the surface of the bearing ring. In order to partially counterbalance the pressure of the fluid in the pipe sections which tends to force the pipe sections apart, and at the same time to lubricate the bearing ring 30, a series of radially extending, fluid conducting ports 38 are provided in the outer ball member 12. The ports 38 communicate with the space between the bearing ring 30 and the outer ball 12 and with the interior of the pipe section, and the ports are disposed outwardly of the transverse medial plane of the outer ball, whereby the fluid in the pipes may flow through said ports creating a force on the outer ball member 12 which urges the pipe section 14 toward the pipe section 20.

The magnitude of the force $f_1$, urging the pipe sections 14 and 20 away from each other will be equal to the pressure of the fluid in the system $P_1$, multiplied by the cross-sectional area $a_1$ enclosed by sealing ring 36 in a transverse plane extending through said seal ring 36 and the inner ball 18. The magnitude of the force $f_2$, urging the pipe section 14 toward pipe section 20 will be equal to the pressure $P_2$, of the fluid forced through the ports 38 multiplied by the area $a_2$, of an axial projection of the surface area of the outer ball member 12 that lies between the seals 32 and 34. The area $a_2$, will be equal to the area enclosed by the sealing ring 34 minus the area enclosed by the sealing ring 32. Clearly, sealing ring 32, and consequently the area which lies between the sealing rings 32 and 34, will have to be on the side of the outer ball member 12 which faces a direction opposite to the direction in which the outer ball member is to be urged. Since $P_1$ will be equal to $P_2$, in order to equate $f_2$ to $f_1$, it is only necessary to make $a_1$ equal to $a_2$.

If $f_2$ were equal to $f_1$, the outer ball 12 would be able to float freely in the socket member 16, and galling of the bearing ring 30 would be substantially eliminated. However, extrusion and pinching of sealing rings 32 and 34 would be possible when the outer ball rotated in the socket. This problem is alleviated, according to the invention, simply by making $a_2$ slightly less than $a_1$ so that the outer ball 12 will be slightly thrust against the primary bearing ring 30. To further guard against extrusion of the sealing ring 34, that ring is placed slightly off of the maximum cross sectional area of the outer ball 12, toward the sealing ring 32.

As can be seen from the foregoing, the pipe joint 10 is partially pressure balanced to permit flexing of pipe section 14 relative to pipe section 20. It is not subject to fatigue failure since it does not depend on the relative thickness of any portion of the joint for its flexibility. The provision of the ports 38 in the outer ball member, and the careful placement of the sealing rings 32 and 34 permits partial counterbalancing of the force of the fluid in the system which urges the pipe sections away from one another, and at the same time permits use of the fluid to lubricate the surface of the primary bearing 30.

Existing pressure balanced ball and socket flexible pipe joints are completely balanced. That is, there are no intentional or designed resultant forces created by internal pressure. Thus the ball is free to float or move in its socket formed by embracing members. Under service conditions vibration will cause the ball member to move (vibrate) with respect to these other members, thus causing wear of seals between these members, due to extrusion of the seals into the clearance space under the pressure and subsequent pinching and cutting of the seal extrusions by the vibration, and galling of the ball and its bearing due to vibration of the ball within its socket.

The solution of this problem according to the present invention is to stop the relative undesired vibratory motion of the ball within its socket, and to confine the motion to the desired motion of pivoting or rotation of the ball around its pivot center.

This is accomplished according to the invention by providing a force to maintain intimate contact of the ball with its housing or bearing. This force is proportional to the imbalance purposely built in. The amount of imbalance is directed by the internal pressure; the size of the pipe connection; and the bearing materials. As a rule the imbalance should be caused by a differential area of approximately 5% to 50%. The imbalance is determined by examining the friction characteristics of the bearing. If the bearing is of plastic material such as a nylon or a Teflon (trademark) type bearing, for example, then there is an optimum bearing load where the coefficient of friction is reduced.

This load or slightly higher is selected as the desired load and sufficient imbalance is designed to achieve this load, that is:

Pressure times area enclosed by primary seal is greater than pressure times area enclosed between secondary seals by an amount equal to the required force on the bearing. This force is calculated from:

Bearing force equals optimum bearing load or pressure times bearing area.

This design technique prevents bearing failures but additionally it retains the pressure balancing or counter-acting seals (secondary seals) within their grooves, prevents extrusion and thus pinching and attrition of the seals and also requires less manufatcuring exactness since by the present invention manufacturing tolerances do not affect seal life and performance to the same degree as in conventional designs.

Therefore, depending on the materials chosen for the bearings and ball, the internal pressure and the size of the pipe connection, the amount of imbalance can be chosen in the range of from 5% to 50%.

The imbalance should always be with the ball thrust against the secondary seal and the bearing ring. For small pipe connections, i.e. small bearing area, greater imbalance is required than for larger units made out of the same material. The pipe size may desirably be from approximately 2 inches to 6 inches.

This invention, therefore, involves a partially pressure balanced ball and socket flexible pipe connection which not only requires low forces to move or flex but also ensures long life because of the imbalance design of the invention which protects all seals which previously wore by attrition, by extrusion and pinching thereof due to vibration, and protects all bearings which previously galled under actual operating conditions. Because of such important improvements in operating quality provided, the partially pressure balanced ball and socket flexible pipe connection of this invention is superior to known pressure balanced flexible pipe connections and can be competitive with other types of flexible pipe connections which do not involve any pressure balancing means. This is especially true for high pressure fluid service where failsafe qualities are of paramount importance. Also the flexible pipe connection of the invention is better suited to corrosive environments, such as for carrying sea water, than are prior art flexible connections. Additionally, it can be manufactured at a lower cost than prior art devices, since this design requires less precise machining and lower manufacturing tolerances.

The device of the invention can be used in any piping system which contains fluid at pressures from 0 to 1500 pounds per square inch, and temperatures from $-100°$ to $+550°$. The temperature pressure requirements are only limited by the limitations of the ring seals available. The device is especially well suited for sea water and fresh water piping systems for modern submarines.

There is now described an example of a partially balanced ball and socket flexible pipe joint which has been designed and built according to the invention and satisfactorily tested.

The amount of imbalance in this test example was 32.5 percent based on approximate friction coefficients and approximate maximum bearing loads providing qualitative and not precise or exact answers. For example, it can be said that the material having the trade name or trademark Teflon has been found to have a lower coefficient of friction under most conditions than the materials having the trade names or trademarks Delrin and Nylatron GS.

The amount of imbalance is governed by the amount of the fluid pressure, by the size and allowable stresses of the pipe being joined and by the materials of the bearings and balls. The amount of imbalance of 32.5 percent in this example, is within the range of from 5 percent to 50 percent which is deemed to be a satisfactory range.

Referring to FIG. 1 of the drawings, this discussion outlines the design considerations required by the tested partially balanced ball and socket flexible pipe joint of this example of the present invention.

The primary fluid area is enclosed by a primary seal 36 with a spherical diameter, D, of 4.871 inches.

The area of fluid enclosed $=\dfrac{\pi D^2}{4}=\dfrac{\pi(4.871)^2}{4}=$ 18.65 square inches The secondary or pressure balancing fluid area is bounded by seals 34 and 32 at diameters (projected on a transverse plane) of 7.5 inches and 7.5 (cosine 32.5°) or 6.32 inches respectively.

The area of fluid enclosed $=\dfrac{\pi D_1^2}{4}-\dfrac{\pi D_2^2}{4}=$ $\dfrac{\pi}{4}(7.5^2-6.32^2)=12.75$ square inches Thus, only 68.5% of the primary fluid forces are pressure balanced. The remaining 32.5% will be restrained by the bearing of this invention.

The bearing projected on a transverse plane has an effective area of $\dfrac{\pi}{4}(7.5^2-5.875^2)=17.05$ square inches where 5.875 inches is the smallest diameter of the bearing 30 which is in contact with the ball.

At an internal pressure of 700 pounds per square inch the unbalanced force, N, will be $(18.65-12.75)$ in.$^2 \times 700 \dfrac{\text{lb.}}{\text{in.}^2}=4,130$ lbs.

However, when restrained by the bearing structure of this invention the bearing load is:

$\dfrac{4,130 \text{ lbs.}}{17.05 \text{ in.}^2}=242$ p.s.i.

Utilizing Nylatron GS (trademark) beaings the coefficient of friction $\mu \approx 0.3$, thus $F=\mu N=.3(4,130)=1,239$ lbs. force required to cause motion.

For Delrin (trademark) $\mu \approx .25$.
$F=\mu N=.24(4,130)=1,032$ lbs.
For Teflon (trademark) $\mu \approx .5$.
$F=\mu N=620$ lbs.

The moment M, required to flex will now be each of these forces times its lever arm L.

L=7.5/2=3.75 inches
M=LF
=3.75(1239)=4,630 in. lbs. Nylatron
=3.75(1,032)=3,870 in. lbs. Delrin
=3.75(620)=2,320 in. lbs. Teflon These moments would cause pipe line stresses according to the relationship $S=\dfrac{MC}{I}$ for 4″ schedule 40 pipe where C=2.25 (the outside radius of the pipe, to the outermost fiber of the pipe)
I=7.23 (the moment of inertia)

$S=\dfrac{4630(2.25)}{7.23}=1,440$ p.s.i. (a very low pipe fiber stress for the highest moment)

A higher imbalance would cause a higher bearing load. The bearings are limited to avoid excess deformation.

|  | Max. load, p.s.i. |
|---|---|
| Nylatron GS (trademark) | ≈350 |
| Delrin (trademark) | ≈800 |
| Teflon (trademark) | ≈150 |

In this instance 242 p.s.i., Teflon (trademark) could not be used but the other two materials can be used.

A higher pressure yields higher bearing loads and higher forces and moments to deflect.

Essentially the amount of maximum imbalance is directly governed by the allowable bearing pressure and the allowable pipe fiber stress (moment to deflect). The allowable pipe fiber stress is in direct proportion to the moment to deflect, where this moment is represented by the letter M in the equation S=MC/I.

On the other hand complete pressure balancing requires larger devices, heavier weight, and does not provide the forces to restrain the seals and hold them in intimate contact with their sealing surface.

Figure 2:
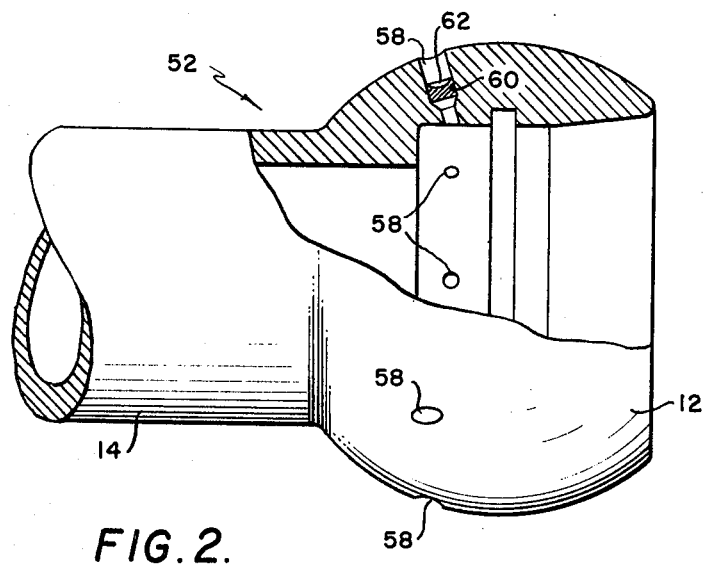
FIGS. 2 and 3 are plan views, partly in section, of modified forms of the outer ball member shown in FIG. 1.
Figure 3:
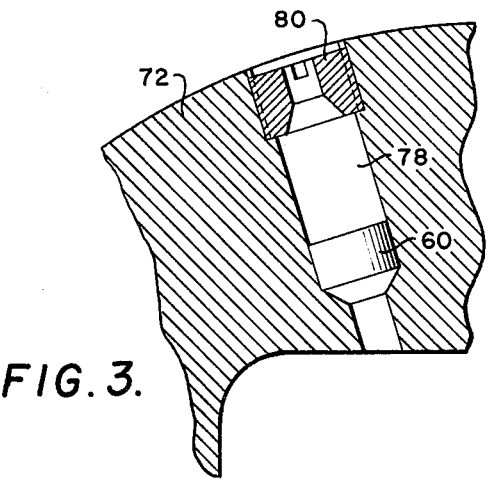

If the fluid used in the piping system would tend to cause corrosion of the bearing ring 30, such as sea water would, one of the modified forms of the outer ball members illustrated in FIGS. 2 and 3 should be employed. Each port 58 in outer ball member 52 has a piston 60 disposed therein, and that portion of the port between the piston 60 and the bearing ring is packed with grease, or some other suitable lubricant. When this form of the outer ball member is used, the fluid pressure in the pipes will force the piston 60 radially outward to force the lubricant between the outer ball and bearing ring, thereby urging pipe section 14 toward the pipe section 20 in the same manner that the fluid in the piping system in FIG. 1 does. Piston 60 may have a concave surface 62 to permit a maximum quantity of lubricant to be placed in the port 58, for a piston of the particular dimensions shown.

The port 78 in the outer ball member 72 in FIG. 3 is threaded at the end adjacent the bearing ring, and an apertured, externally threaded plug 80 is secured therein. This plug prevents piston 60 from extruding out of the port and scratching the bearing ring. Port 78 may extend through the outer ball member at an angle, to provide the maximum length of the port to permit a maximum quantity of lubricant to be used therein.

As can readily be seen from the foregoing, the use of piston members and grease in the ports in the outer ball member will protect the primary bearing ring 30 from corrosion by the fluid in the system, without any loss in the pressure balancing characteristics.

Figure 4:
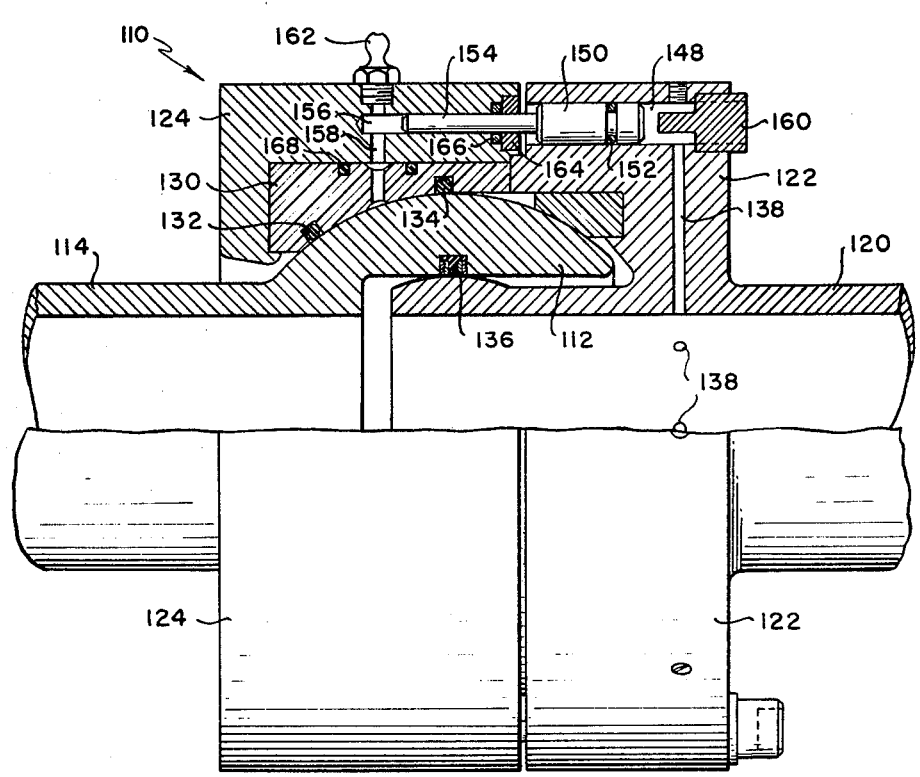
FIG. 4 is a plan view, partly in section, of a modified form of this invention.

The modified form of the pipe joint shown in FIG. 4 is particularly adapted for use with large diameter pipes. When the diameter of pipe section 120 is relatively large, it would be impractical to make the surface area of the outer ball member 112 which lies between sealing rings 132 and 134 large enough so that an axial projection of this area will be substantially equal to the area enclosed by sealing ring 136. Pipe joint 110 is designed to amplify the effective pressure of the fluid acting on the outer surface of the outer ball member 112 so that the area between the sealing rings 132 and 134 may be kept small.

As can be seen in FIG. 4, fluid conducting ports 138 extend through extension 122 of pipe section 120, and communicate with piston chamber 148. A piston 150 is disposed in each chamber 148, and has a sealing ring 152 in a groove therein. Piston 150 has a reduced diameter portion 154 which extends into a piston chamber 156 in retainer housing 124, and the piston chamber 156 communicates with a port 158 which extends through the retainer housing 124 and the bearing ring 130. The space between the reduced piston portion 154 and the outer ball member 112 is filled with a grease or other lubricant, which may be injected through a grease fitting 162. An externally threaded annular retainer ring 164 is secured in the open end of piston chamber 156 to maintain a sealing ring 166 around the reduced piston portion 154. Sealing rings 168 are disposed in grooves between the primary bearing ring 130 and the retainer housing 124 to prevent leakage of the lubricant therebetween.

When fluid is contained in pipes 114 and 120, the force $f_3$, urging the pipe sections 114 and 120 apart will be equal to the pressure $p_3$, of the fluid in the pipes, multiplied by the area $a_3$, enclosed by the sealing ring 136. The force $f_4$, urging the outer ball member 112 toward the pipe section 120 will be equal to the pressure $p_4$, of the lubricant in port 158, multiplied by the area $a_4$, of an axial projection of the surface area of the outer ball joint which lies between the sealing rings 132 and 134. Since the area of the face of the piston 150 against which the fluid flowing through port 138 acts is larger than the area of the face of the reduced piston 154 which forces the lubricant against the outer ball member $p_4$ will be greater than $p_3$. Since it is desired to make $f_3$ substantially equal to but slightly greater than $f_4$, $p_3a_3$ must substantially equal and be slightly greater than $p_4a_4$. Since $p_4$ is greater than $p_3$, $a_4$ may be kept considerably smaller than $a_3$. Thus if pressure amplification factor $p_4/p_3=4$, $a_4$ need only be about ¼ of $a_3$. Therefore, even in large diameter piping systems where it is impractical or impossible to make $a_4$ substantially equal to or only slightly less than $a_3$, the pipe joint of this invention may still be used by employing the pressure amplification system described above, while maintaining $f_3$ greater than $f_4$ to provide the partial pressure balance of the invention.

As explained in the discussion of pipe joint 10 above, $f_4$ should be made slightly less than $f_4$ so that the outer ball 112 will be slightly thrust against the bearing ring 130 and sealing rings 132 and 134, to protect against extrusion and pinching of the sealing rings by movement of the ball relative to the bearing ring. In addition, sealing ring 134 and the groove retaining it are located slightly off the maximum cross-sectional area of the outer ball member 112, toward the sealing ring 132.

As can be seen from the foregoing, this invention provides improved, partially pressure-balanced, self-lubricating, ball-and-socket pipe joints.

What is claimed is:

1. A flexible pipe joint for connecting pipe sections to carry a pressurized fluid, comprising:

a first pipe section having a socket member on one end thereof;

a second pipe section having a hollow outer ball member on one end thereof movably received in said socket member; means providing for the passage of the fluid pressure from the interior of the pipe sections to the space between the outer surface of said ball member and the inner surface of said socket member;

fastening means for attaching said first pipe section to said second pipe section;

first and second annular sealing means spaced apart and disposed between said socket member and said outer ball member and defining an area for receiving said fluid pressure from said passage means; said sealing means being positioned entirely at one side of a medial plane extending through said outer ball member and at the side thereof nearest said second pipe section;

an inner ball member carried on said first pipe section and being received within the inner peripheral surface of said hollow outer ball member; and third annular sealing means disposed between said inner ball member and said hollow outer ball member, said third sealing means being selected such that the axially projected transverse area adjacent said third sealing means acted upon by fluid pressure in said pipe section is substantially greater than the axially projected transverse area between said first and second sealing means whereby the fluid force acting upon the axially projected transverse area adjacent said third sealing means is partially balanced by the fluid force acting upon said axially projected transverse area between said first and second sealing means.

2. A flexible pipe joint according to claim 1 in which said axially projected transverse area adjacent said third sealing means is from about 5% to 50% larger than the said axially projected transverse area between said first and second sealing means.

3. A flexible pipe joint according to claim 1 in which: said passage means comprises a plurality of passages extending from the interior of said hollow outer ball member to the outer peripheral surface thereof; and terminating in a plurality of ports positioned intermediate said first and second sealing means.

4. A flexible pipe joint according to claim 3, wherein:
a piston is slidably carried in each of said passages in said outer ball member and wherein the portion of each passage between the piston therein and the socket member is packed with a lubricant;
said piston when acted on by the pressure of said fluid medium in said pipe sections being operable to force the lubricant into the space between the opposing peripheral surface areas of said outer ball member and said socket member;
said lubricant imposing the same pressure on said peripheral surface area of said outer ball member between the said first and second annular sealing means as is imposed on said pistons by the pressurized fluid in said pipe sections.

5. In a flexible pipe joint according to claim 1 and further comprising:
a bearing ring associated with said socket member and having an inner peripheral surface engaging the outer peripheral surface of said outer ball member; and
spaced apart annular grooves in said bearing ring receiving said first and second sealing means which engage said outer ball.

6. In a flexible pipe joint according to claim 1 wherein said hollow outer ball member has an annular recess in its said inner peripheral surface and said third sealing means is disposed in said annular recess.

7. A flexible pipe joint according to claim 1 in which:
said socket member includes a retainer housing detachably secured to said socket member; and
a bearing ring disposed in said retainer housing and having an inner peripheral surface engaging the outer peripheral surface of said outer ball member;
said retainer housing when secured to said socket member being operable to hold the components of said pipe joint in assembly;
said passage means including a passage formed by a plurality of communicating ports and chambers leading from the interior of said first pipe section, through said first pipe section, through said retainer housing, and through said bearing to the outer surface of said outer ball member.

8. A flexible pipe joint according to claim 7 wherein:
a piston is disposed in said passage; and
the portion of said passage formed by those of said communicating ports and chambers which lie between said piston and said outer ball member is adapted to be filled with a quantity of lubricant.

9. A flexible pipe joint according to claim 8 which includes:
means for multiplying the pressure of the fluid in the pipe sections to increase the pressure of the lubricant acting on the outer surface of said outer ball member.

10. A flexible pipe joint according to claim 9 wherein:
said means for multiplying the pressure includes a reduced portion of said piston on the end of said piston which acts on the lubricant.

References Cited

UNITED STATES PATENTS

| | | | |
|---|---|---|---|
| 2,421,691 | 6/1947 | Gibson et al. | 285—106 X |
| 2,810,592 | 10/1957 | Williams | 285—94 X |
| 2,907,593 | 10/1959 | De Phillips | 285—271 X |
| 3,165,339 | 1/1965 | Faccou | 285—263 |
| 3,186,740 | 6/1965 | Lee | 285—354 X |

FOREIGN PATENTS

| | | |
|---|---|---|
| 382,671 | 11/1923 | Germany. |
| 1,015,649 | 9/1957 | Germany. |
| 520,715 | 5/1940 | Great Britain. |

CARL W. TOMLIN, Primary Examiner

D. W. AROLA, Assistant Examiner

U.S. Cl. X.R.

285—106, 263, 271